WAVE FILTER

Filed Dec. 12, 1957

INVENTOR
C. T. GRANT
BY
Ralph P. Holcomb
ATTORNEY 2,990,525

WAVE FILTER

Clarence T. Grant, Maplewood, N.J., assignor to Bell Telephone Laboratories, Incorporated, New York, N.Y., a corporation of New York Filed Dec. 12, 1957, Ser. No. 702,479
1 Claim. (Cl. 333—72)

This invention relates to wave transmission networks and more particularly to wave filters employing piezoelectric crystals.

An object of the invention is to reduce the cost of band-pass crystal filters. Another object is to adjust the location of a loss peak in a band-pass filter of the transformer bridge (or hybrid) type using two crystals with the same physical dimensions. A more specific object is to make the loss peaks in such a filter symmetrical about the mid-band frequency. Related objects are to increase the linearity of the phase shift and sharpen the cut-off in a filter of this type.

It is known that two piezoelectric crystals may be associated with a transformer to form a filter circuit of the transformer bridge, or hybrid, type. For a band-pass characteristic with an attenuation peak in each side of the band, one of the crystals must have a slightly larger inductance and a slightly lower resonant frequency than the other crystal.

In accordance with the present invention, the cost of such a filter is reduced by using crystals which have the same physical dimensions, and thus can be more economically produced in larger quantities. In practice, all of the crystals for a series of band filters operating in a fairly broad frequency range may be of the same size. One of the crystals is mechanically loaded to lower its resonant frequency by half the desired bandwidth. This loading may be conveniently done by using a heavier electrode plating. In the resulting insertion-loss characteristic, the lower peak is farther from the midband frequency than is the upper peak. In accordance with a further feature of the invention, the lower peak is moved to a higher frequency and the lower cut-off of the filter is thereby sharpened by tapping the primary side of the transformer at a point off center. One way to do this is to shunt the primary winding by two unequal capacitors connected in series. The common terminal of the capacitors is connected to a filter terminal. The capacitance of the capacitors in series tunes the primary winding to the midband frequency of the filter. The individual capacitances differ by the proper amount to move the lower loss peak to the desired frequency. In particular, the loss peaks may be located symmetrically with respect to the midband frequency, thus increasing the linearity of the phase shift of the filter both across and outside of the transmission band, especially in the regions of the cut-off frequencies. A linear phase characteristic is desirable for some applications. A capacitor may be shunted across each crystal and properly adjusted to improve the loss characteristic of the filter, especially in the band.

Figure 1:
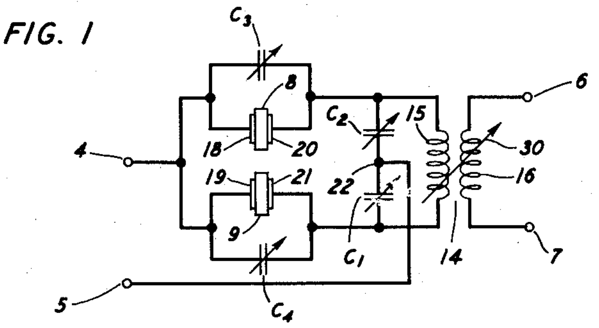
Figure 2:
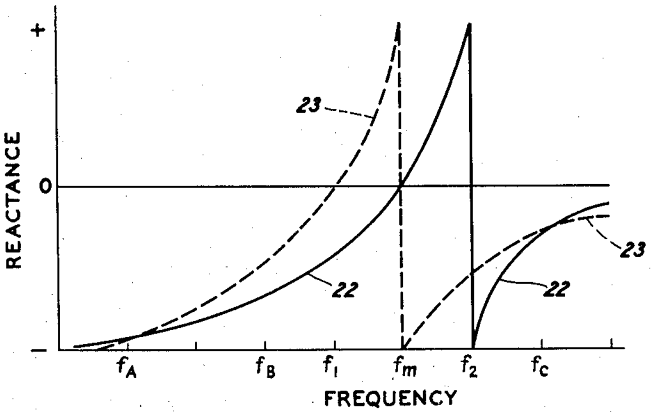
Figure 3:
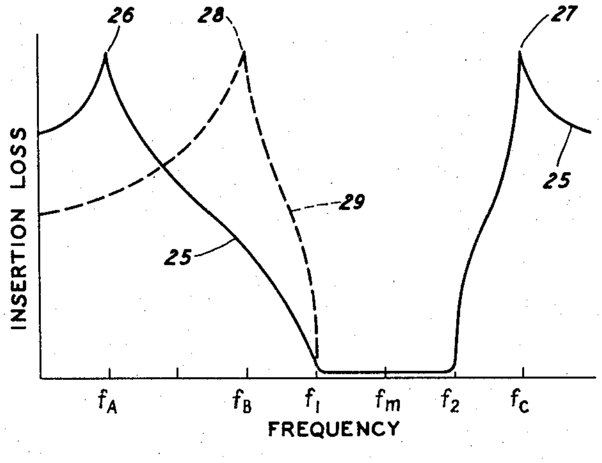

The nature of the invention and its various objects, features, and advantages will appear more fully in the following detailed description of a typical embodiment illustrated in the accompanying drawing, of which FIG. 1 is a schematic circuit of a transformer bridge filter in accordance with the invention;

FIG. 2 shows typical reactance-frequency characteristics of the piezoelectric crystals used in FIG. 1; and FIG. 3 shows characteristics of insertion loss versus frequency obtainable with the filter of FIG. 1.

The filter shown in FIG. 1 comprises a first pair of terminals 4, 5, a second pair of terminals 6, 7, two piezoelectric crystals 8, 9, four capacitors of value $C_1$, $C_2$, $C_3$ and $C_4$, and a transformer 14 with a primary winding 15 and a secondary winding 16. The terminals 4, 5 may be the input terminals and 6, 7 the output, or vice versa. An electrode 18 of the crystal 8 and an electrode 19 of the crystal 9 are connected to the terminal 4 and the electrodes 20 and 21 are connected, respectively, to the ends of the winding 15. The capacitors $C_1$ and $C_2$ are connected in series across the winding 15, and their common terminal 22 to the filter terminal 5. The secondary winding 16 is connected between the filter terminals 6 and 7. The capacitors $C_3$ and $C_4$ are connected in parallel, respectively, with the crystals 8 and 9.

The crystals 8 and 9 have the same corresponding physical dimensions and substantially the same interelectrode capacitances. For example, each may be a disk with full electrode plating on each major face. The weight of the electrodes on one of the crystals, say 8, is selected or adjusted so that the crystal is resonant at the desired midband frequency $f_m$. The crystal will have a reactance-frequency characteristic of the type shown by the solid-line curve 22 in FIG. 2, with a resonance at $f_m$ and an anti-resonance at a higher frequency $f_2$, which defines the upper cut-off of the filter. The shunt capacitor $C_3$ may be added to provide an adjustment of $f_2$, if desired.

The other crystal, 9, is mechanically loaded to make it resonant at the lower cut-off frequency $f_1$, which is half of the bandwidth below $f_m$. The electrodes 19 and 21 may be increased in thickness to provide this loading. The capacitor $C_4$ is adjusted to make the antiresonance of the crystal 9 coincide with the resonance of the crystal 8 at the midband frequency $f_m$. The crystal 9 will now have the reactance characteristic shown by the broken-line curve 23 in FIG. 2.

Assuming that the capacitors $C_1$ and $C_2$ are equal, the filter will have an insertion-loss characteristic of the type shown by the solid-line curve 25 in FIG. 3. It has a transmission band between the frequencies $f_1$ and $f_2$ and peaks of loss at the frequencies $f_A$ and $f_C$, one on either side of the band, where the curves 22 and 23 cross. These peaks are unsymmetrically positioned about the midband frequency $f_m$, with the lower peak 26 farther away than the upper peak 27. This increases the nonlinearity of the phase-shift characteristic, especially near the cut-off frequencies, and reduces the sharpness of the lower cut-off.

The frequency $f_A$ of the lower peak 26 may be raised, and the frequencies of the peaks made symmetrical about $f_m$ if desired, by properly choosing the values of $C_1$ and $C_2$. The capacitance of $C_1$ and $C_2$ in series is chosen to resonate with the winding 15 at $f_m$. If $C_1$ is increased and $C_2$ decreased by the proper amount, the frequencies $f_A$ and $f_C$ are both moved toward $f_m$, but $f_A$ at a much faster rate than $f_C$. These capacitors may be made adjustable, as indicated by the arrows, for this purpose. In this way, the peak 26 may be moved from $f_A$ to the frequency $f_B$, as shown at the point 28 in the broken-line curve 29 in FIG. 3. The upper peak 27 is moved to a slightly lower frequency and the lower cut-off $f_1$ is raised slightly, but these changes are so small that they are not indicated in FIG. 3. It is thus apparent that $C_1$ and $C_2$ may be adjusted to make the peaks 27 and 28 symmetrical with respect to the midband frequency $f_m$.

In an alternative method, the frequency of the peak 26 may be raised to $f_B$ by adjusting only one of the capacitors $C_1$ and $C_2$. Either $C_1$ can be made larger or $C_2$ made smaller. In this case, the inductance of the winding 15 is adjusted so that it still resonates with $C_1$ and $C_2$ in series at $f_m$. The arrow 30 indicates this adjustment. It may be provided, for example, by a movable magnetic slug associated with the winding 15, or with both windings of the transformer 14.

It is to be understood that the above-described arrangement is only illustrative of the application of the principles of the invention. Numerous other arrangements may be devised by those skilled in the art without departing from the spirit and scope of the invention.

What is claimed is:

A band-pass wave filter comprising a transformer, two capacitors connected in series across one winding of the transformer to form a circuit resonant at the midband frequency of the filter, two piezoelectric crystals having the same physical dimensions and equal interelectrode capacitances but the electrodes of one of the crystals being heavier than those of the other crystal whereby the crystals have different resonant frequencies, an electrode of each of the crystals being connected to a terminal of the filter, the other electrodes being connected, respectively, to the ends of the one winding, the common terminal of the capacitors being connected to another terminal of the filter, the filter having a loss peak on each side of the transmission band, and the capacitors having unequal capacitances chosen to make said loss peaks approximately symmetrical about the midband frequency, whereby the lower cut-off of the filter is sharpened and the phase-shift characteristic of the filter is made more linear both within and outside of the transmission band.

References Cited in the file of this patent

UNITED STATES PATENTS

| | | |
|---|---|---|
| 1,848,630 | Hulburt | Mar. 8, 1932 |
| 2,054,757 | Lamb | Sept. 15, 1936 |
| 2,159,891 | Guerbilsky | May 23, 1939 |
| 2,185,599 | Mason | Jan. 2, 1940 |
| 2,216,937 | Ciccolella | Oct. 8, 1940 |
| 2,878,454 | Leming et al. | Mar. 17, 1959 |
| 2,929,031 | Kosowsky | Mar. 15, 1960 |

OTHER REFERENCES

Mason "Electromechanical Transducers and Wave Filters," C. Van Nostrand Company, Inc., pages 258–260, 1948.

"Shifting Filter-Crystal Frequencies," Q.S.T., vol. 37, No. 4, April 1953, page 51.